United States Patent
Seo (10) Patent No.: US 8,769,638 B2
(45) Date of Patent: Jul. 1, 2014

(54) DIGITAL CONTENT AUTHENTICATION SYSTEM, IMAGE DISPLAY APPARATUS APPLIED TO THE SAME, AND DIGITAL CONTENT AUTHENTICATION CONTROLLING METHOD OF THE SAME

(75) Inventor: Jae-hong Seo, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 798 days.

(21) Appl. No.: 11/767,540

(22) Filed: Jun. 25, 2007

(65) Prior Publication Data

US 2008/0127330 A1 May 29, 2008

(30) Foreign Application Priority Data

Nov. 24, 2006 (KR) .................. 10-2006-0117219

(51) Int. Cl.
*H04L 29/06* (2006.01)

(52) U.S. Cl.
USPC ............. 726/5; 726/26; 726/27; 713/176; 713/193; 709/224

(58) Field of Classification Search
USPC ........................... 726/20, 5; 713/168
See application file for complete search history.

(56) References Cited

U.S. PATENT DOCUMENTS

| | | | | |
|---|---|---|---|---|
| 6,839,851 B1 * | 1/2005 | Saitoh et al. | | 726/13 |
| 6,940,977 B1 * | 9/2005 | Manabe | | 380/232 |
| 7,293,077 B1 * | 11/2007 | Teo et al. | | 709/221 |
| 7,356,848 B1 * | 4/2008 | Duffield et al. | | 726/29 |
| 7,539,865 B2 | 5/2009 | Hatakeyama | | |
| 7,565,530 B2 | 7/2009 | Kwak et al. | | |
| 7,668,241 B2 * | 2/2010 | Sung et al. | | 375/240.25 |
| 7,991,873 B2 * | 8/2011 | Kato et al. | | 709/224 |
| 8,584,255 B2 * | 11/2013 | Barry et al. | | 726/27 |
| 2002/0027991 A1 * | 3/2002 | Kuroda et al. | | 380/210 |
| 2003/0125083 A1 * | 7/2003 | Iwasaki | | 455/558 |
| 2004/0021679 A1 * | 2/2004 | Chapman et al. | | 345/700 |
| 2004/0100942 A1 * | 5/2004 | Blank et al. | | 370/352 |
| 2005/0089167 A1 * | 4/2005 | Saitoh et al. | | 380/201 |
| 2005/0154917 A1 | 7/2005 | deCarmo | | |
| 2005/0193215 A1 * | 9/2005 | Hatakeyama | | 713/193 |
| 2005/0228995 A1 * | 10/2005 | Kwak et al. | | 713/168 |

(Continued)

FOREIGN PATENT DOCUMENTS

| CN | 1781095 A | 5/2006 |
|---|---|---|
| CN | 1863304 A | 11/2006 |

(Continued)

OTHER PUBLICATIONS

DCP, "High-bandwidth Digital Content Protection System", Revision 1.1, Jun. 9, 2003, XP002517268.*

(Continued)

*Primary Examiner* — Morshed Mehedi
(74) *Attorney, Agent, or Firm* — Sughrue Mion, PLLC (57) ABSTRACT

A digital content authentication system, an image display apparatus applied to the system, and a digital content authentication controlling method of the system are provided. The image display apparatus includes an interface section which demands authentication results from a plurality of source providing apparatuses through a bus and receiving responses to the demanding for the authentication result and an output section outputting the authentication results by the received response. Accordingly, the image display apparatus can recognize the authentication states of the source providing apparatuses.

20 Claims, 7 Drawing Sheets

(56) References Cited

U.S. PATENT DOCUMENTS

| | | | |
|---|---|---|---|
| 2006/0028362 A1* | 2/2006 | Fujiwara | 341/110 |
| 2006/0104617 A1* | 5/2006 | Mukaide et al. | 386/97 |
| 2006/0136997 A1* | 6/2006 | Telek et al. | 726/5 |
| 2006/0200675 A1* | 9/2006 | Maeng et al. | 713/176 |
| 2006/0259985 A1 | 11/2006 | Hong et al. | |
| 2007/0189288 A1* | 8/2007 | Andrews et al. | 370/390 |

FOREIGN PATENT DOCUMENTS

| | | |
|---|---|---|
| JP | 2005-242605 A | 9/2005 |
| KR | 10-2005-0098515 A | 10/2005 |
| WO | 2006/121279 A1 | 11/2006 |

OTHER PUBLICATIONS

Communication dated Nov. 5, 2012, issued by the State Intellectual Property Office of People's Republic of China in counterpart Chinese Patent Application No. 200710138250.1.

Communication dated Dec. 15, 2011 issued by the European Patent Office in counterpart European Patent Application No. 07110871.6.

HDMI Licensing, et al: "High-Definition Multimedia Interface Specification Version 1.2a", Dec. 14, 2005, pp. 1-193, XP002657964.

Digital Content Protection LLC: "High-bandwidth Digital Content Protection System 1.1", Jun. 9, 2003, pp. 1-85, XP002517268.

Communication dated Dec. 23, 2013 issued by the Korean Intellectual Property Office in counterpart Korean Application No. 10-2006-0117219.

* cited by examiner

DIGITAL CONTENT AUTHENTICATION SYSTEM, IMAGE DISPLAY APPARATUS APPLIED TO THE SAME, AND DIGITAL CONTENT AUTHENTICATION CONTROLLING METHOD OF THE SAME

CROSS-REFERENCE TO RELATED APPLICATIONS

This application claims priority 35 U.S.C. §119 from Korean Patent Application No. 10-2006-0117219, filed on Nov. 24, 2006, the entire content of which is incorporated herein by reference.

BACKGROUND OF THE INVENTION

1. Field of the Invention

Apparatuses and methods consistent with the present invention relate to a digital content authentication system, an image display apparatus applied to the system, and a digital content authentication controlling method of the system, and more particularly, to a digital content authentication system, an image display apparatus applied to the system, and a digital content authentication controlling method of the system which can confirm a digital content authentication result by the image display apparatus.

2. Description of the Related Art

Recently, aspects of digital contents have taken on more significance. Especially, use of a digital versatile disk (DVD) as a record medium for recording and reproducing an image at a high quality has increased and a digital television (TV) having a high resolution has been developed in the TV field.

Accordingly, users using various DVD apparatus, such as a DVD player, a DVD recorder, etc., for recording and reproducing an image in a DVD by connecting them to a TV have increased. Additionally, an interface such as a high definition multimedia interface (HDMI) for transmitting data between a DVD apparatus and a TV has been standardized.

The HDMI is a broadcasting standard for protecting multimedia contents in a TV having a high resolution and is the first multimedia interface capable of transmitting uncompressed digital audio and video signals. Additionally, the HDMI takes the form in which conventional Red-Green-Blue (RGB), Y, Cb/Cr channels, and eight audio channels are integrated in one channel.

Figure 1:
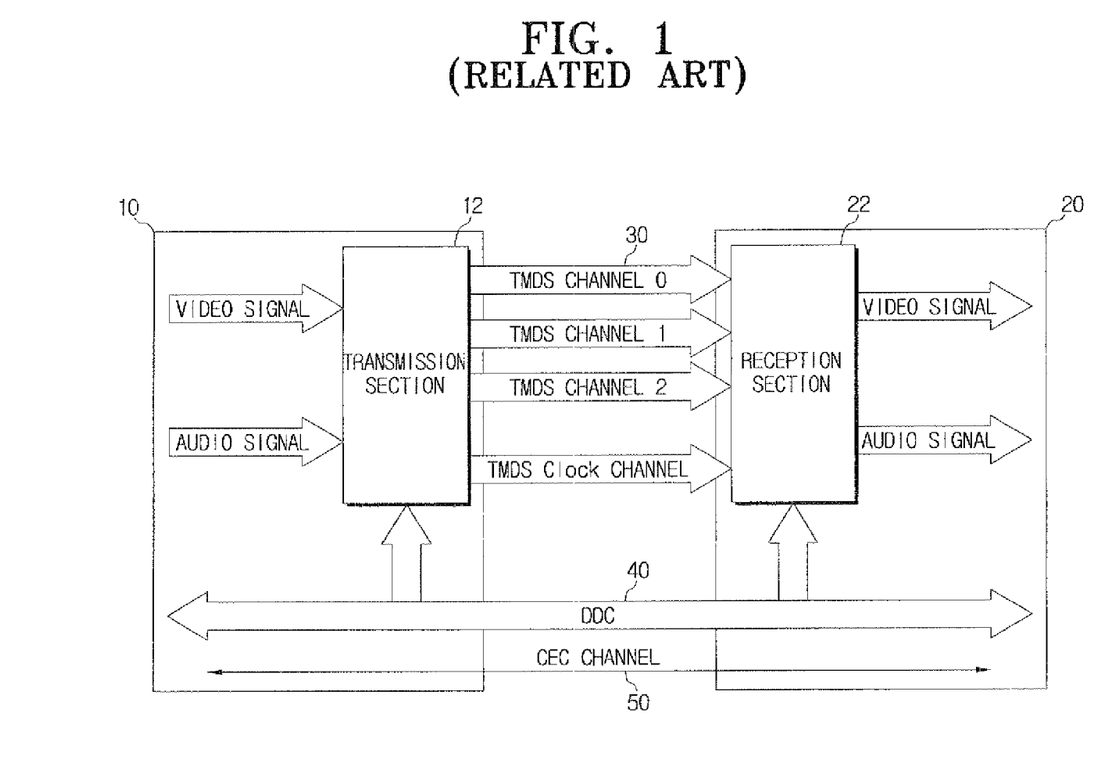
FIG. 1 is a view showing a general HDMI system.

FIG. 1 is a view showing a general HDMI system.

Referring to FIG. 1, the HDMI system includes a source providing apparatus 10 and a TV 20. The source providing apparatus 10 includes a transmission section 12 transmitting video and audio signals and the TV 20 includes a reception section 22 receiving the video and audio signals transmitted from the source providing apparatus 10.

The source providing apparatus 10 and the TV 20 can transmit and receive audio/video (A/V) data, device information, and control instructions through three independent communication channels, i.e. transition minimized differential signaling (TMDS) channels 30, a display data channel (DDC) 40, a consumer electronics control (CEC) channel 50.

The source providing apparatus 10 and the TV are connected to each other in the form of peer to peer (P2P) through the TMDS channels 30 and the DDC 40 and are connected in the form of a bus through the CEC channel 50. This is illustrated in FIG. 2.

Figure 2:
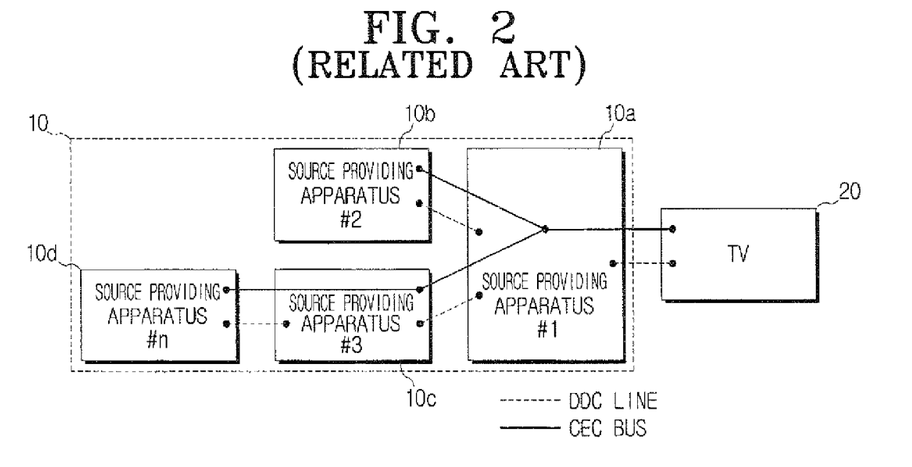
FIG. 2 is a view showing a connection state of a channel in a HDMI system.

FIG. 2 is a view showing the connection states of the channels in the HDMI system.

Referring to FIG. 2, the source providing apparatuses #1 to #n (10a to 10d) constituting the HDMI system are hierarchically connected to the TV 20. The TV 20 and the source providing apparatuses #1 to #n (10a to 10d) are connected to one another in the form of P2P through the DDC 40 and are connected in the form of a bus through the CEC channel 50.

In the HDMI system, the TV 10 can control the source providing apparatuses #1 to #n (10a to 10d) through the CEC channel 50 and can confirm the operation states of the source providing apparatuses #1 to #n (10a to 10d) through the CEC channel 50.

Authentication procedures are required between the TV 20 and the source providing apparatuses #1 to #n (10a to 10d). Video and audio signals may be normally processed only if the authentications between the TV 20 and the source providing apparatuses #1 to #n (10a to 10d) have succeeded. If any of the authentications between the TV 20 and the source providing apparatuses #1 to #n (10a to 10d) has failed, the TV 20 cannot process normal video and audio signals.

For example, even if the authentication between the TV 20 and the source providing apparatus #1 (10a) has succeeded, if the authentication between the source providing apparatus #1 (10a) and the source providing apparatus #3 (10c) has failed, the source providing apparatus #1 (10a) cannot normally receive video and audio signals from the source providing apparatus #3 (10c) and then the TV 20 cannot normally receive video and audio signals either.

If an authentication error is generated in the HDMI system, the TV 20 generally generate a noise signal. Then, the generation of an authentication error cannot be recognized at all from the TV 20.

Additionally, although the authentication error has a problem in high-bandwidth digital content protection (HDCP) processing in the source providing apparatuses #1 to #n (10a to 10d) regardless of the TV 20, a user can misrecognize that an error is generated in the TV 20.

SUMMARY OF THE INVENTION

The present invention provides a digital content authentication system, an image display apparatus applied to the system, and a digital content authentication controlling method of the system which can recognize authentication states of digital contents of source providing apparatuses through a channel connected in the form of a bus.

The above aspect of the present invention is substantially realized by providing a digital content authentication system comprising: an image display apparatus which demands an authentication result; a plurality of source providing apparatuses hierarchically connected to the image display apparatus, wherein each source providing apparatus performs authentication of the image display apparatus and transmits the authentication result in response to the demanding for the authentication result by the image display apparatus.

In an exemplary implementation, the image display apparatus and the plurality of source providing apparatuses may be apparatuses which support high-bandwidth digital content protection (HDCP), and the authentication may be a high definition multimedia interface (HDMI) authentication and a bus may be formed by a consumer electronics control (CEC) channel.

On the other hand, an image display apparatus according to an exemplary embodiment of the present invention comprises: an interface section which demands authentication results from a plurality of source providing apparatuses and receiving responses to the demanding for the authentication results; and an output section which outputs the authentication results according to the received responses.

In an exemplary implementation, the image display apparatus may further comprise: a control section which controls the output section to output the authentication results if at least one of the received responses corresponds to an authentication failure.

In an exemplary implementation, the authentication results output from the output section may include information on at least one of the plurality of source providing apparatuses which has failed in an authentication performed in response to the demanding of the authentication results.

In an exemplary implementation, the control section may repeatedly demand an authentication result through the interface section for a critical period of time if the at least one of the received responses corresponds to the authentication failure, and may output the authentication results to the output section if at least one of responses to the repeated demanding corresponds to the authentication failure even after the critical period of time elapses.

In an exemplary implementation, if a demand signal for conversion of an input source is received, the control section may demand an authentication result from one of the plurality of source providing apparatuses which corresponds to the received demand signal.

In an exemplary implementation, the control section may demand the authentication result from one of the plurality of source providing apparatuses the connection of which has been confirmed through the interface section.

In an exemplary implementation, the authentication may be a high definition multimedia interface (HDMI) authentication and a bus is formed by a consumer electronics control (CEC) channel.

On the other hand, a method according to an exemplary embodiment of the present invention comprises: demanding authentication results from a plurality of source providing apparatuses; receiving responses to the demanding of the authentication results; and outputting the authentication results according to the received responses.

In an exemplary implementation, the authentication result may be output if at least one of the received responses corresponds to an authentication failure.

In an exemplary implementation, the output authentication results may include information on at least one of the plurality of source providing apparatuses which has failed in an authentication performed in response to the demanding of the authentication results.

In an exemplary implementation, the outputting the authentication results may comprise: demanding an authentication result for a critical period of time repeatedly if the at least one of the received responses corresponds to the authentication failure; and outputting the authentication results if at least one of responses to the repeated demanding corresponds to the authentication failure even after the critical period of time elapses.

In an exemplary implementation, the demanding the authentication results may comprise: receiving a demand signal for conversion of an input source; and demanding an authentication result from one of the plurality of source providing apparatuses which corresponds to the received demand signal.

In an exemplary implementation, the demanding the authentication results may be demanding from one of the plurality of source providing apparatuses if the connection between the image display apparatus and the at least one of the plurality of source providing apparatuses has been confirmed.

In an exemplary implementation, the authentication may be a high definition multimedia interface (HDMI) authentication and a bus may be formed by a consumer electronics control (CEC) channel.

BRIEF DESCRIPTION OF THE DRAWINGS

The above and other aspects of the present invention will become more apparent by describing certain exemplary embodiments of the present invention with reference to the accompanying drawings, in which.

DETAILED DESCRIPTION OF EXEMPLARY EMBODIMENTS

Hereinafter, exemplary embodiments of the present invention will be described in detail with reference to the accompanying drawings.

Figure 3:
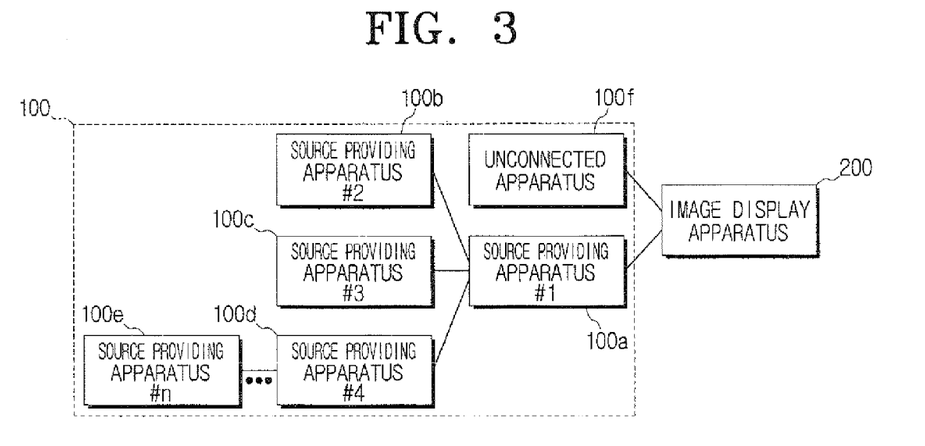
FIG. 3 is a block diagram showing a digital content authentication system according to an exemplary embodiment of the present invention.

FIG. 3 is a block diagram showing a digital content authentication system according to an exemplary embodiment of the present invention.

Referring to FIG. 3, the digital content authentication system according to the exemplary embodiment of the present invention includes a plurality of source providing apparatuses 100 and an image display apparatus 200. The plurality of source providing apparatuses 100 and the image display apparatus 200 are apparatus supporting high-bandwidth digital content protection (HDCP).

If the plurality of source providing apparatuses 100 and the image display apparatus 200 support the HDCP, an authentication procedure for normally transmitting and receiving an input source between the plurality of source providing apparatuses 100 and the image display apparatus 200 is required. Then, the authentication may be a high definition multimedia interface (HDMI) authentication.

If the plurality of source providing apparatuses 100 and the image display apparatus 200 are HDMI-based apparatuses, the plurality of source providing apparatuses 100 and the image source apparatus 200 can mutually transmit and receive an input source through TMDS channels 30, a DDC 40, and a CEC channel 50 as shown in FIG. 1.

That is, the plurality of source providing apparatuses 100 and the image display apparatus 200 are connected to one another in the form of peer to peer (P2P) through the TMDS channels 30 and the DDC 40 and are connected in the form of a bus through the CEC channel 50.

The input source transmitted and received between the plurality of source providing apparatuses 100 and the image display apparatus 200 may be digital signals supporting the HDCP and includes audio signals, video signals, synchronous signals, device information, and a control instruction.

The image display apparatus 200 is connected to the plurality of source providing apparatuses 100 through an HDMI cable, and demands authentication results from the plurality of source providing apparatuses 100 and receives a response to the demand. The image display apparatus 200 may be a digital TV.

The image display apparatus 200 demands the authentication results using the CEC channel 50 of three types of channels constituting the HDMI cable which may be connected in the form of one bus.

The CEC channel 50 is an additional protocol performing high-level control functions in the HDMI and is a channel which may operate well in a low transmission speed, a small memory, and a performance environment.

The plurality of source providing apparatuses 100 is hierarchically connected to the image display apparatus 200 through the HDMI cable. The plurality of source providing apparatuses 100 receives an authentication code from the image display apparatus 200 to perform the authentication and transmits a response to a request for an authentication result of the image display apparatus 200 if the authentication result is demanded.

In the exemplary embodiment, source providing apparatuses #1 to #n (100a to 100e) and an unconnected apparatus 100f are exemplified as the plurality of source providing apparatuses 100. For example, the source providing apparatus #1 (100a) may be an A/V receiver, the source providing apparatus #2 (100b) may be a DVD player, the source providing apparatus #3 (100c) may be a D-VHS device, the source providing apparatus #4 (100d) may be a set-top box, and the source providing apparatus #n (100e) may be a personal video recorder (PVR).

Logical addresses are allocated to the image display apparatus 200, the source providing apparatuses #1 to #n (100a to 100e), the unconnected apparatus 100f, which constitute the digital content authentication system, respectively. The logical addresses which may be allocated to the apparatus are exemplified in Table 1.

TABLE 1

| ADDRESS | USABLE APPARATUS |
| --- | --- |
| 0 | TV |
| 1 | RECORD APPARATUS 1 |
| 2 | RECORD APPARATUS 2 |
| 3 | SET TOP BOX 1 |
| 4 | DVD PLAYER 1 |
| 5 | AUDIO SYSTEM |
| 6 | SET TOP BOX 2 |
| 7 | SET TOP BOX 3 |
| 8 | DVD PLAYER 2 |

TABLE 1-continued

| ADDRESS | USABLE APPARATUS |
| --- | --- |
| 9 | RECORD APPARATUS 3 |
| 10 | RESERVED |
| 11 | RESERVED |
| 12 | RESERVED |
| 13 | RESERVED |
| 14 | USER DEFINED |
| 15 | UNREGISTERED |

For example, an address of "0.0.0.0" may be allocated to the image display apparatus 200, an address of "1.0.0.0" may be allocated to the unconnected apparatus 100f, and addresses of "2.0.0.0", "2.1.0.0", "2.2.0.0", "2.3.0.0" and "2.3.1.0" may be allocated to the source providing apparatuses #1 to #n (100a to 100e).

The source providing apparatus 100 and the image display apparatus 200 will be described in detail with reference to FIGS. 4 and 5.

Figure 4:
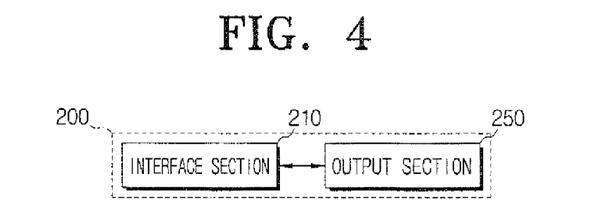
FIG. 4 is a block diagram of an image display apparatus according to an exemplary embodiment of the present invention.

FIG. 4 is a block diagram of an image display apparatus according to an exemplary embodiment of the present invention.

Referring to FIG. 4, the image display apparatus 200 according to the exemplary embodiment of the present invention includes an interface section 210 and an output section 250.

The interface section 210 demands authentication results from the plurality of source providing apparatuses 100 through a bus, i.e. the CEC channel 50. Additionally, the interface section 210 receives responses to the demands for the authentication results transmitted from the plurality of source providing apparatuses 100.

The output section 250 outputs the authentication results by the responses to the demands for the authentication results received by the interface section 210.

Figure 5:
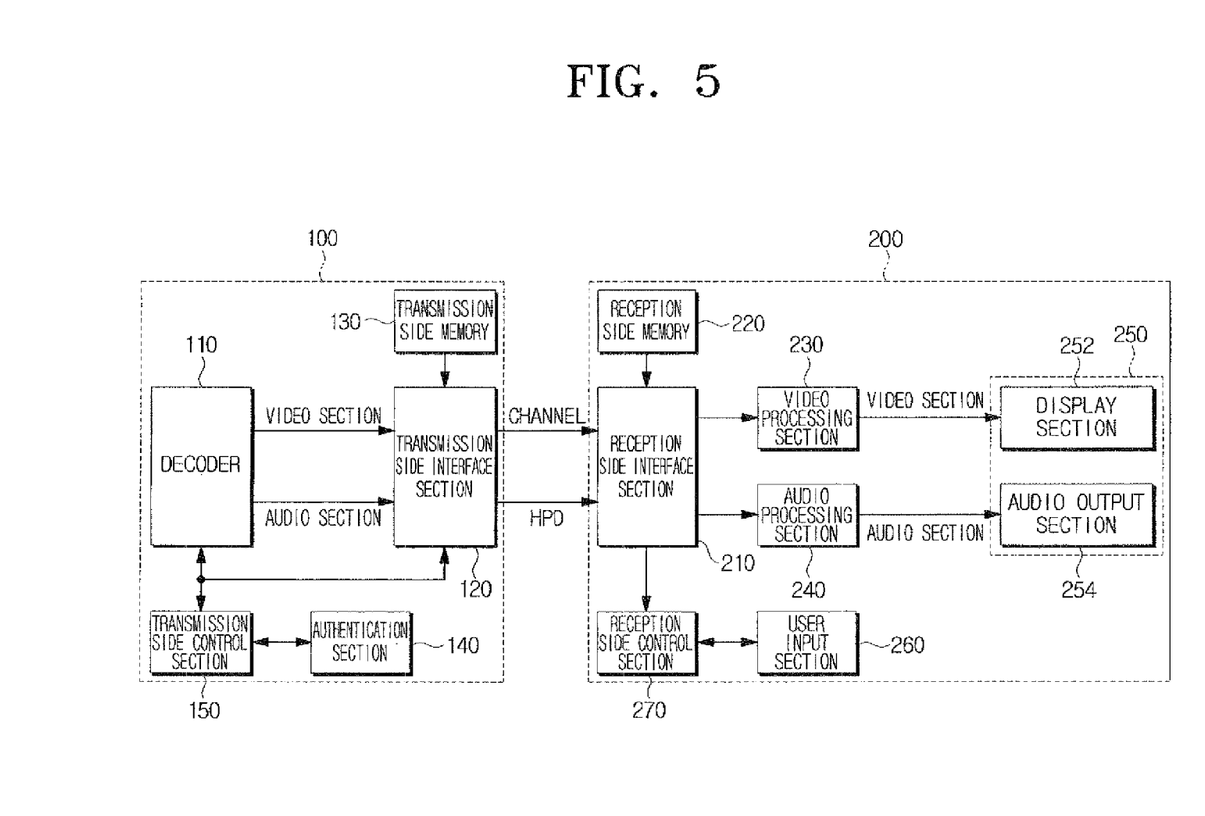
FIG. 5 is a block diagram of an image display apparatus and a source providing apparatus according to another exemplary embodiment of the present invention.

FIG. 5 is a block diagram of an image display apparatus and a source providing apparatus according to another embodiment of the present invention.

The source providing apparatus #1 (100a) directly connected to the image display apparatus 200 is exemplified as the source providing apparatus 100 shown in FIG. 5, for the sake of convenience. However, the source providing apparatus 100 shown in FIG. 5 may be a common constitution of each of the source providing apparatuses #1 to #n (100a to 100e).

The source providing apparatus 100 and the image display apparatus 200 are connected to a channel line and a hot plug detection (HPD) line. The channel line is a line for transmitting and receiving an input source and includes the TMDS channels 30, the DDC 40, and the CEC channel 50 as shown in FIG. 1. Additionally, the HDP line is a line for confirming the cable connection state between the source providing apparatus 100 and the image display apparatus 200.

The source providing apparatus 100 includes a decoder 110, a transmission side interface section 120, a transmission side memory 130, an authentication section 140, and a transmission side control section 150.

The decoder 110 decodes an input source which has been received from one of a driver (not shown) installed in the source providing apparatus 100 and the source providing apparatuses #2 to #3 (100b to 100d).

The transmission side interface section 120 receives and encodes video and audio signals output from the decoder 110 and transmits the encoded signals through a channel connected to the image display apparatus 200. The transmission side interface section 120 receives the demands for the authentication results from the image display apparatus 200 and transmits the responses to the demands for the authentication results of the image display apparatus 200.

The transmission side memory 130 stores an authentication code, i.e. a key value and an authentication bit, for determining whether the image display apparatus 200 is suitable for transmission of the input source.

The authentication section 140 performs an HDMI authentication for determining whether the image display apparatus 200 is suitable for transmission of the input source if the source providing apparatus 100 is turned on or if necessary. The authentication section 140 performs the authentication using an authentication code received from the image display apparatus 200 through the transmission side interface section 120 and an authentication code stored in the transmission side memory 130.

The transmission side control section 150 controls the overall functions of the source providing apparatus 100 and controls a signal input/output between the decoder 110, the transmission side interface section 120, the transmission side memory 130, and the authentication section 140.

The transmission side control section 150 allows the authentication result (for example, an authentication success or an authentication failure) of the authentication section 140 to be transmitted to the image display apparatus 200, if a demand for the authentication result from the image display apparatus 200 is received through the transmission side interface section 120.

The image display apparatus 200 includes a reception side interface section 210, a reception side memory 220, a video processing section 230, an audio processing section 240, an output section 250, a user input section 260, and a reception side control section 270.

The reception side interface section 210 receives an input source from the transmission side interface section 120 of the source providing apparatus 100. Additionally, the reception side interface section 210 demands authentication results from the source providing apparatuses #1 to #n (100a to 100e) under the control of the reception side control section 270.

In the exemplary embodiment, since the reception side interface section 210 has the same constitution as the interface section 210 shown in FIG. 4, it is referred to as a reception side interface section 210 to distinguish it from the transmission side interface section 120 of the source providing apparatus 100 and the same reference numerals as in the interface section 210 shown in FIG. 4 are used.

The reception side memory 220 stores authentication codes to be used in the HDMI authentication with the source providing apparatus 100.

The video processing section 230 processes video signals received from the reception side interface 210 and provides them to the output section 250 and the audio processing section 240 processes audio signals received from the reception side interface section 210 and provides them to the output section 250.

The output section 250 is adapted to provide the authentication results to a user and includes a display section 250 and an audio output section 254. The display section 252 displays the video signals processed by the video processing section 230 and the audio output section 254 outputs the audio signals processed by the audio processing section 240.

Demand signals are input to the user input section 260 by a user and the demand signals input from a remote controller (not shown) or a manipulation panel (not shown) are provided to the reception side control section 270. In the exemplary embodiment, the user input section 260 can receive demand signals for conversion of input sources from a user.

The reception side control section 270 controls the overall functions of the image display apparatus 200 and controls a signal input/output between the reception side interface section 210, the reception side memory 220, the video processing section 230, the audio processing section 240, the output section 250, and the user input section 260.

The reception side control section 270 demands the authentication result through the reception side interface section 210 from the plurality of source providing apparatuses, i.e. the source providing apparatuses #1 to #n (100a to 100e), which are connected to the image display apparatus 200 through the bus. That is, the reception side control section 270 demands the authentication results, through the CEC channel 50, from all the source providing apparatuses connected to the image display apparatus 200.

The reception side control section 270 can demand the authentication results through the reception side interface 210 if the cable connection states of the image display apparatus 200 and the source providing apparatuses #1 to #n (100a to 100e) are confirmed after the image display apparatus 200 is turned on.

If the reception side control section 270 receives a demand signal for conversion of an input source from the user input section 260, it can demand an authentication result from a source providing apparatus corresponding to the demand signal for conversion of an input source through the reception side interface section 210.

After the reception side control section 270 receives the authentication results of the source providing apparatuses #1 to #n (110a to 100e) though the reception side interface section 210, it controls the display section 252 to display the authentication result if at least one of the received authentication results has failed. Then, the authentication results displayed on the display section 252 include a message informing a user of the information on the source providing apparatus which has failed in authentication and an authentication failure.

The reception side control section 270 can repeatedly demand an authentication result for a preset critical period of time if the response to the demand for the authentication result received through the reception side interface section 210 corresponds to an authentication failure.

Then, if the response corresponds to an authentication failure in spite of the repeated demands for the authentication result for the critical period of time, the reception side control section 270 can control the display section 252 to display the authentication result. The preset critical period of time may be two seconds.

Figure 6:
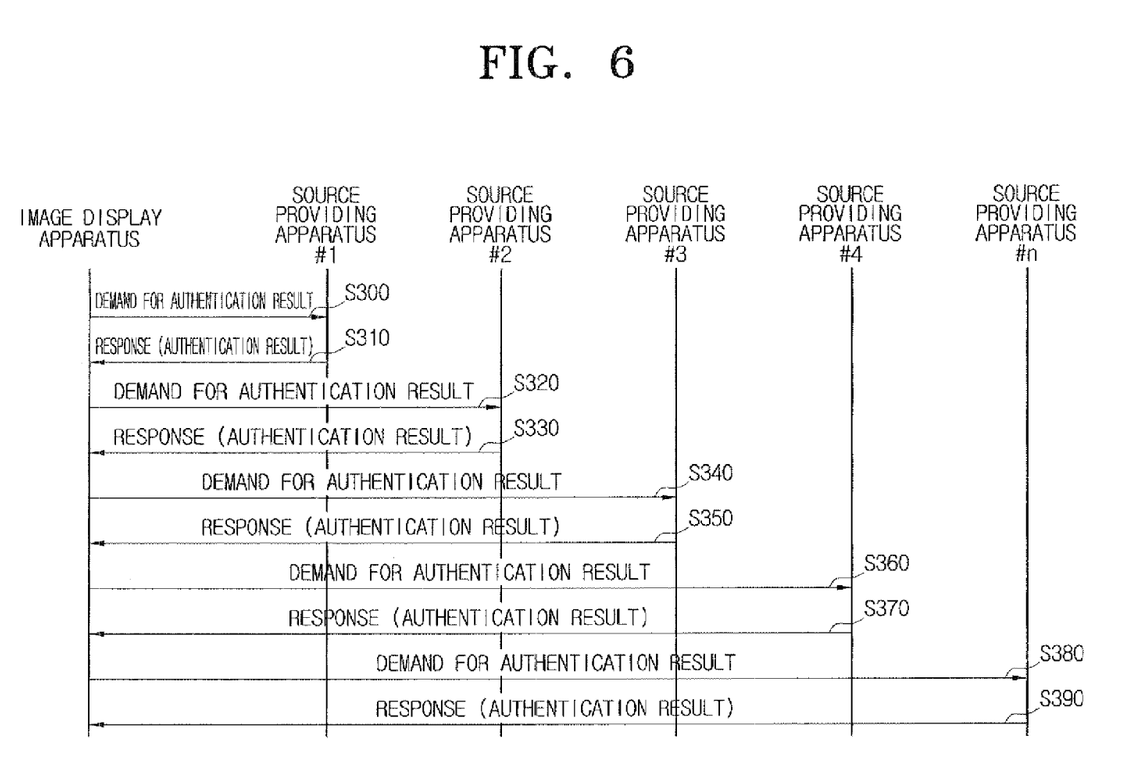
FIG. 6 is a flow chart showing an example of a signal flow of an image display apparatus and a source providing apparatus in a digital content authentication system shown in FIG. 3.

FIG. 6 is a flow chart showing an example of a signal flow of the image display apparatus and the source providing apparatus in the digital content authentication system shown in FIG. 3.

The image display apparatus 200 demands authentication results, through the CEC channel, from all source providing apparatuses, i.e. the source providing apparatuses #1 to #n (100a to 100e), the connections of which have been confirmed. The image display apparatus 200 can demand the authentication results using the logical addresses allocated to the source providing apparatuses #1 to #n (100a to 100e).

The source providing apparatuses #1 to #n (100a to 100e) which have received the demands for the authentication results from the image display apparatus 200 transmits the authentication performed result (for example, an authentication success or an authentication failure) of each authentication section 140 to the image display apparatus 200.

Referring to FIG. 6, after the image display apparatus 200 is turned on, it demands an authentication result from the source providing apparatus #1 (100a) (S300), and the source providing apparatus #1 (100a) transmits a response to the demand for the authentication result (S310). After the image display apparatus 200 is turned on, it can confirm the cable connection state through the HPD line.

Then, the image display apparatus 200 demands an authentication result from the source providing apparatus #2 (100b) through the CEC channel 50 (S320), and the source providing apparatus #2 (100b) transmits a response to the demand for the authentication result (S330).

Then, the image display apparatus 200 demands an authentication result from the source providing apparatus #3 (100c) through the CEC channel 50 (S340), and the source providing apparatus #3 (100c) transmits a response to the demand for the authentication result (S350).

Then, the image display apparatus 200 demands an authentication result from the source providing apparatus #4 (100d) through the CEC channel 50 (S360), and the source providing apparatus #4 100d transmits a response to the demand for the authentication result (S370).

Then, the image display apparatus 200 demands an authentication result from the source providing apparatus #n (100e) through the CEC channel 50 (S380), and the source providing apparatus #n 100e transmits a response to the demand for the authentication result (S390).

Although the image display apparatus 200 sequentially demands the authentication results one by one from the source providing apparatuses #1 to #n (100a to 100e) in the exemplary embodiment, the present invention is not limited to it. For example, the image display apparatus 200 can demands authentication results from the source providing apparatuses #1 to #n (100a to 100e) at the same time.

Figure 7:
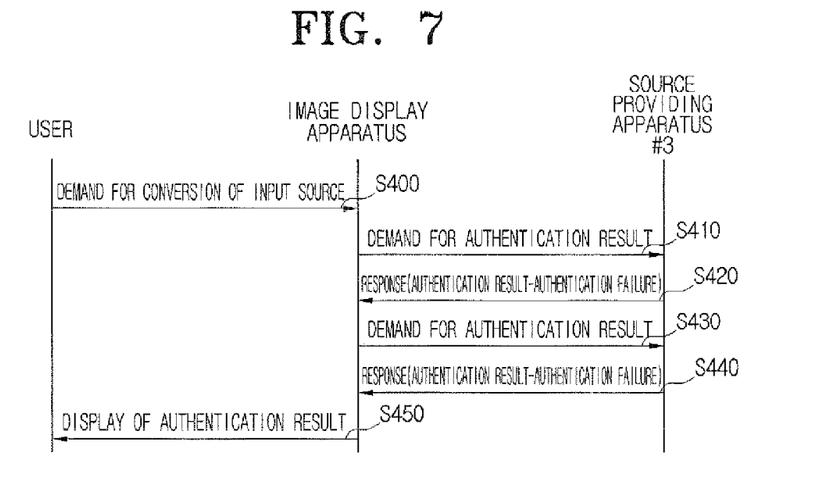
FIG. 7 is a flow chart showing another example of a signal flow of an image display apparatus and a source providing apparatus in a digital content authentication system shown in FIG. 3.

FIG. 7 is a flow chart showing another example of a signal flow of the image display apparatus and the source providing apparatus in the digital content authentication system shown in FIG. 3.

A user inputs a demand signal for conversion of an input source through a remote controller or a function key provided in the manipulation panel of the image display apparatus 200 (S400). The demand signal for conversion of an input source input by the user is assumed to be a signal demanding conversion to the source providing apparatus #3 (100d).

The image display apparatus 200 receives a demand signal for conversion of an input source through the user input section 260 and demands an authentication result from the source providing apparatus #3 (100c) after changing the setting for conversion to the corresponding source providing apparatus (S410).

If the source providing apparatus #3 (100c) receives an authentication result demand signal from the image display apparatus 200, it transmits a result obtained by performing an HDMI authentication by the authentication section 140 to the image display apparatus 200. The authentication result may correspond to an authentication failure (S420).

If the authentication result which has been received from the source providing apparatus #3 (100c) corresponds to an authentication failure, the image display apparatus 200 demands an authentication result again after a predetermined period of time elapses (S430).

If the source providing apparatus #3 (100c) receives an authentication result demand signal from the image display apparatus 200, the result which has been obtained by performing the HDMI authentication by the authentication section 140 is transmitted to the image display apparatus 200 again. The authentication result may again correspond to an authentication failure (S440).

The image display apparatus 200 receives the authentication result from the source providing apparatus #3 (100c) and the authentication result is displayed on the display section 252 if the authentication result of the source providing apparatus #3 (100c) corresponds to an authentication failure continuously in spite of the repeated demands for the authentication results (S450).

Although the process of demanding an authentication result from the source providing apparatus #3 (100c) by the image display apparatus 200 has been repeated two times, the present invention is not limited to it. The demand for an authentication result by the image display apparatus 200 may be repeated several times in the preset critical period of time.

Figure 8:
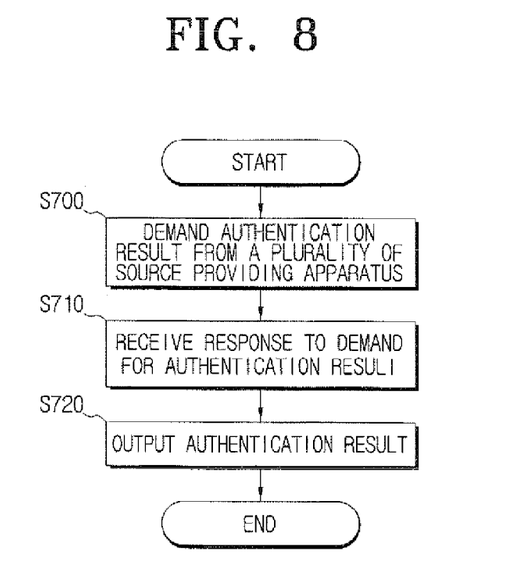
FIG. 8 is a flow chart for explaining a digital content authentication controlling method of an image display apparatus according to an exemplary embodiment of the present invention.

FIG. 8 is a flow chart for explaining a digital content authentication controlling method of an image display apparatus according to an exemplary embodiment of the present invention.

The image display apparatus 200 demands authentication results, through the CEC channel 50, from the source providing apparatuses #1 to #n (100a to 100e) connected to the image display apparatus 200 (S700).

The source providing apparatuses #1 to #n (100a to 100e) which have received the demands for the authentication results by the image display apparatus 200 transmit responses to the demands for the authentication results, and the image display apparatus 200 receives the responses to the demands for the authentication results (S710).

The image display apparatus 200 displays the authentication results which have been received from the source providing apparatuses #1 to #n (100a to 100e), though the output section 250. The output section 250 outputs only the authentic result in the case of an authentication failure (S720).

Figure 9:
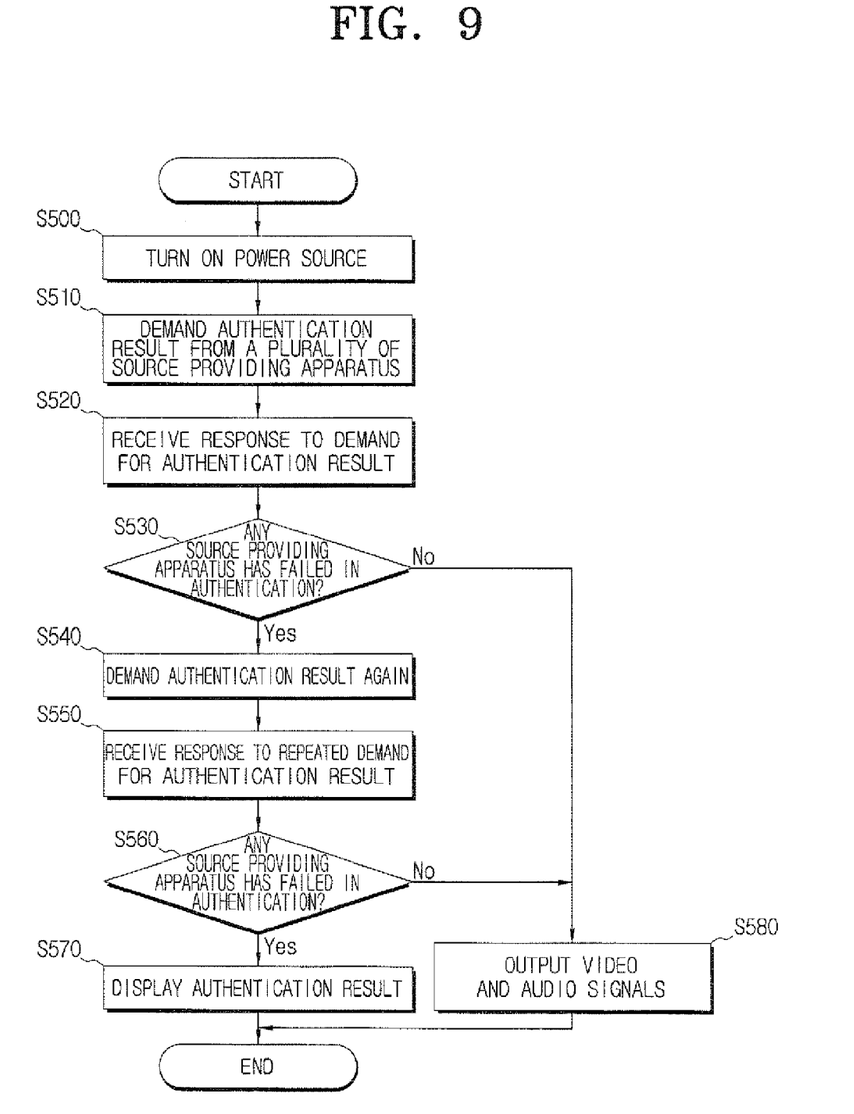
FIG. 9 is a flow chart for explaining a digital content authentication controlling method of an image display apparatus according to another exemplary embodiment of the present invention.

FIG. 9 is a flow chart for explaining an example of a digital content authentication controlling method of an image display apparatus according to another exemplary embodiment of the present invention.

If the power source of the image display apparatus 200 is turned on, the reception side control section 270 demands authentication results from the source providing apparatuses #1 to #n (100a to 100e) through the reception side interface section 210 (S510).

The source providing apparatuses #1 to #n (100a to 100e) from which the image display apparatus 200 has demanded the authentication results transmit responses to the demands for the authentication results, and the image display apparatus 200 receives the authentication results through the reception side interface section 210 (S520).

The reception side control section 270 determines whether any of the source providing apparatuses #1 to #n (100a to 100e) has failed in the authentication using the authentication results which have been received through the reception side interface section 210 (S530).

In S530, if any of the source providing apparatuses has failed in the authentication (S530-Y), the reception side control section 270 demands an authentication result from the source providing apparatus which has failed in the authentication through the reception side interface section 210 again (S540). Then, the number of the source providing apparatus which has failed in the authentication may be one or more.

If an authentication result is demanded by the image display apparatus 200 through the reception side interface section 210 again, the source providing apparatus receiving the demand for the authentication result again transmits the authentication result by the authentication section 140 again. The image display apparatus 200 receives the authentication result transmitted from the source providing apparatus through the reception side interface section 210 again (S550). S540 and S550 may be repeated several times in a critical period of time.

After the critical period of time elapses, the reception side control section 270 of the image display apparatus 200 determines again whether any of the source providing apparatus has failed in the authentication through the authentication results which have been received from the source providing apparatus (S560).

In S560, if any of the source providing apparatus has failed in the authentication in spite of the repeated demands for the authentication results (S560-Y), the reception side control section 270 displays the authentication results on the display section 252 (S570).

If it is determined that there is not a source providing apparatus which has failed in the authentication in S530 and S560, the reception side interface section 210 can normally receive an input source, and, thus, video signals and audio signals are output through the display section 252 and the audio output section 254 (S580).

Figure 10:
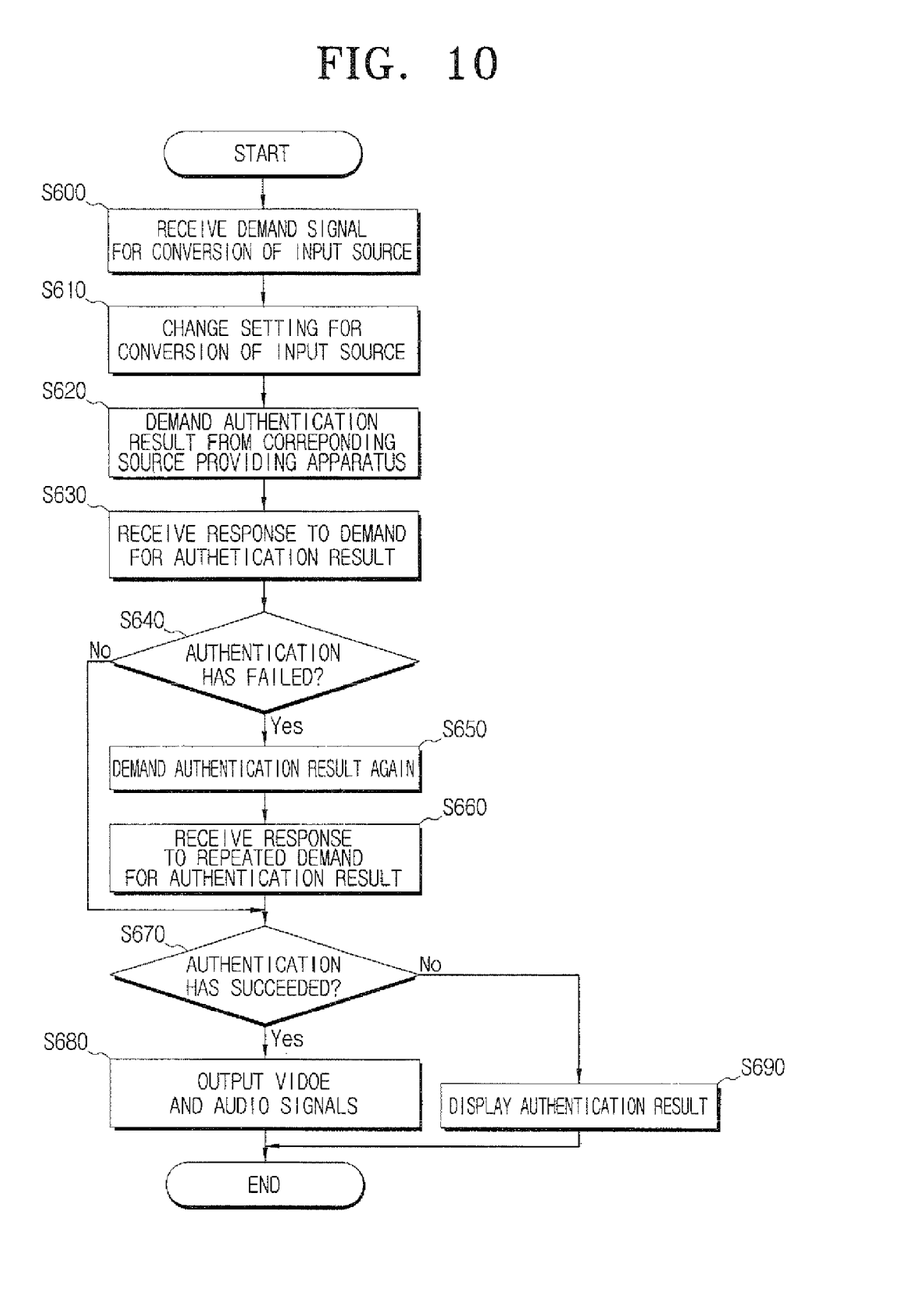
FIG. 10 is a flow chart for explaining an example of a digital content authentication controlling method of an image display apparatus according to another exemplary embodiment of the present invention.

FIG. 10 is a flow chart for explaining an example of a digital content authentication controlling method according to another exemplary embodiment of the present invention.

In the state in which the image display apparatus 200 receives an input source from one of the source providing apparatuses #1 to #n (100a to 100e), if a demand signal for conversion of an input source is received in the user input section 260 by manipulation of a user (S600), the reception side control section 270 changes the setting for conversion of the input source (S610).

The reception side control section 270 demands an authentication result from one of the source providing apparatuses #1 to #n (100a to 100e) which provides an input source to be converted by a user, through the reception side interface section 210 (S620).

The source providing apparatus from which the authentication result has been demanded by the image display apparatus 200 transmits a response to the demand for the authentication result. The image display apparatus 200 receives the response to the demand for the authentication result through the reception side interface section 210 (S630).

The reception side control section 270 determines whether the authentication has failed or succeeded by the response to the demand for the authentication result which has been received from the source providing apparatus (S640).

In S640, if it is determined that the authentication has failed, from the authentication performed result of the source providing apparatus (S640-Y), the reception side control section 270 demands an authentication result from the source providing apparatus through the reception side interface section 210 again after a predetermined period of time elapses (S650).

The source providing apparatus transmits an authentication result again with respect to the repeated demand for the authentication result, and the reception side interface section 210 receives a response to the repeated demand to the authentication result of the source providing apparatus (S660). Operations at S650 and S660 may be repeated in a critical period of time several times.

If the authentication has succeeded by the response to the repeated demand for the authentication result (S670-Y), the reception side control section 270 allows an input source is received from the corresponding source providing apparatus through the reception side interface section 210, and outputs video signals and audio signals through the display section 252 and the audio output section 254 (S680).

If the authentication has failed, in spite of the repeated demand for the authentication result in S670, the reception side control section 270 displays the authentication result on the display section 252 to inform a user of the authentication failure (S690).

As mentioned, if the HDMI authentications between the image display apparatus 200 and the source providing apparatuses #1 to #n (100a to 100e) have been normally performed, normal video and audio signals are output through the display section 252 and the audio output section 254.

However, if the HDMI authentications between the image display apparatus 200 and the source providing apparatuses #1 to #n (100a to 100e) have not been normally performed, normal video and audio signals are not output through the display and the audio output section 254. Then, the image display apparatus 200 recognizes generation of an error and informs a user of the generation of the error through the display section 252.

As mentioned above, In the digital content authentication system, the image display apparatus applied to the system, and the digital content authentication controlling method according to the exemplary embodiments of the present invention, since the image display apparatus demands authentication results through a bus, the authentication states of the digital contents of the source providing apparatus may be recognized.

Additionally, since the image display apparatus informs a user of the authentication states of the source providing apparatus, generation of authentication errors of the source providing apparatus is prevented from being misrecognized as operation errors of the image display apparatus.

Although exemplary embodiments of the present invention have been shown and described, it would be appreciated by those skilled in the art that the present invention is not limited to those exemplary embodiments and various modifications might be made without departing from the essence of the invention, which is claimed in the claims, and the modifications should not be understood separately from the sprit and prospect of the present invention.

What is claimed is:

1. A digital content authentication system comprising:
an image display apparatus which demands an authentication result;
a plurality of source providing apparatuses hierarchically connected to the image display apparatus and configured to provide content to the image display apparatus,
wherein each source providing apparatus performs authentication of the image display apparatus and other connected source providing apparatuses, and transmits the authentication result in response to the demanding for the authentication result by the image display apparatus, and
wherein the image display apparatus receives the authentication result including identification information on the each source providing apparatus and information regarding whether the authentication has succeeded from the each source providing apparatus, and outputs the authentication result in a form of at least one of a video signal and an audio signal.

2. The system as claimed in claim 1, wherein the image display apparatus and the plurality of source providing apparatuses support high-bandwidth digital content protection (HDCP), and the authentication comprises a high definition multimedia interface (HDMI) authentication.

3. The system as claimed in claim 2, wherein the connection between the image display apparatus and the plurality of source providing apparatuses comprises a consumer electronics control (CEC) channel.

4. An image display apparatus hierarchically connected to a plurality of source providing apparatuses, the image display apparatus comprising:
   an interface section which demands authentication results to the plurality of source providing apparatuses and receives responses to the demanding for the authentication results; and
   an output section which outputs the authentication results according to the received responses,
   wherein each source providing apparatus performs authentication of the image display apparatus and other connected source providing apparatuses, and
   wherein at least one of the interface section and the output section is implemented as a hardware component,
   wherein the interface section receives the authentication result including identification information on the each source providing apparatus and information regarding whether the authentication has succeeded from the each source providing apparatus, and the output section outputs the authentication result in a form of at least one of a video signal and an audio signal.

5. The apparatus as claimed in claim 4, further comprising a control section which controls the output section to output the authentication results if at least one of the received responses corresponds to an authentication failure.

6. The apparatus as claimed in claim 4, wherein the authentication results output from the output section comprise information on at least one of the plurality of source providing apparatuses which has failed in an authentication performed in response to the demanding of the authentication results, based on the identification information on the each source providing apparatus and the information regarding whether the authentication has succeeded.

7. The apparatus as claimed in claim 5, wherein the control section repeatedly demands an authentication result through the interface section for a critical period of time if the at least one of the received responses corresponds to the authentication failure, and outputs the authentication results to the output section if at least one of responses to the repeated demanding corresponds to the authentication failure after the critical period of time elapses.

8. The apparatus as claimed in claim 4, wherein if a demand signal for conversion of an input source is received, the control section demands an authentication result from one of the plurality of source providing apparatuses which corresponds to the received demand signal.

9. The apparatus as claimed in claim 5, wherein the control section demands the authentication results from at least one of the plurality of source providing apparatuses if the connection between the apparatus and the at least one of the plurality of source providing apparatuses has been confirmed through the interface section.

10. The apparatus as claimed in claim 4, wherein the authentication comprises a high definition multimedia interface (HDMI) authentication.

11. The apparatus as claimed in claim 10, wherein the connection between the apparatus and the plurality of source providing apparatuses comprises a consumer electronics control (CEC) channel.

12. A digital content authentication controlling method of an image display apparatus hierarchically connected to a plurality of source providing apparatuses, the method comprising:
   demanding authentication results to the plurality of source providing apparatuses;
   receiving responses to the demanding for the authentication results; and
   outputting the authentication results according to the received responses,
   wherein each source providing apparatus performs authentication of the image display apparatus and other connected source providing apparatuses,
   wherein the image display apparatus receives the authentication result including identification information on the each source providing apparatus and information regarding whether the authentication has succeeded from the each source providing apparatus, and outputs the authentication result in form of at least one of a video signal and an audio signal.

13. The method as claimed in claim 12, wherein the authentication results are output if at least one of the received responses corresponds to an authentication failure.

14. The method as claimed in claim 12, wherein the output authentication results comprise information on at least one of the plurality of source providing apparatuses which has failed in an authentication performed in response to the demanding of the authentication results, based on the identification information on the each source providing apparatus and the information regarding whether the authentication has succeeded.

15. The method as claimed in claim 13, wherein the outputting the authentication results comprises:
   demanding an authentication result for a critical period of time repeatedly if the at least one of the received responses corresponds to the authentication failure; and
   outputting the authentication results if at least one of responses to the repeated demanding corresponds to the authentication failure after the critical period of time elapses.

16. The method as claimed in claim 12, wherein the demanding the authentication results comprises:
   receiving a demand signal for conversion of an input source; and
   demanding an authentication result from one of the plurality of source providing apparatuses which corresponds to the received demand signal.

17. The method as claimed in claim 12, wherein, the demanding the authentication results comprises demanding from at least one of the plurality of source providing apparatuses if the connection between the image display apparatus and the at least one of the plurality of source providing apparatuses has been confirmed.

18. The method as claimed in claim 12, wherein the authentication comprises a high definition multimedia interface (HDMI) authentication.

19. The method as claimed in claim 18, wherein the connection between the image display apparatus and the plurality of source providing apparatuses comprises a consumer electronics control (CEC) channel.

20. The system as claimed in claim 1, wherein the identification information on the each source providing apparatus is address information on the each source providing apparatus.

* * * * *